US012725961B2

(12) United States Patent
Lin

(10) Patent No.: US 12,725,961 B2
(45) Date of Patent: Sep. 1, 2026

(54) CONTROL CASE WITH COVER CONTROLLED BY PRESSING BUTTON

(71) Applicant: TIMOTION TECHNOLOGY CO., LTD., New Taipei City (TW)

(72) Inventor: Yu-Chang Lin, New Taipei City (TW)

(73) Assignee: TIMOTION TECHNOLOGY CO., LTD., New Taipei City (TW)

( * ) Notice: Subject to any disclaimer, the term of this patent is extended or adjusted under 35 U.S.C. 154(b) by 325 days.

(21) Appl. No.: 18/675,034

(22) Filed: May 27, 2024

(65) Prior Publication Data

US 2025/0293454 A1 Sep. 18, 2025

(30) Foreign Application Priority Data

Mar. 13, 2024 (TW) ................................ 113202523

(51) Int. Cl.
*H01R 13/506* (2006.01)
*H01R 13/627* (2006.01)

(52) U.S. Cl.
CPC ....... *H01R 13/506* (2013.01); *H01R 13/6275* (2013.01)

(58) Field of Classification Search
CPC .............. H01R 13/506; H01R 13/6275; H05K 5/0221; H05K 5/03
See application file for complete search history.

(56) References Cited

U.S. PATENT DOCUMENTS 6,434,011 B1 * 8/2002 Jenkins ................... G06F 1/181 361/752
2006/0270269 A1 * 11/2006 Quintanilla .......... H01R 13/501 439/417
2019/0024406 A1 * 1/2019 Zhang ..................... E05B 13/10

FOREIGN PATENT DOCUMENTS

CA 3099681 A1 * 11/2019 ............... H05K 5/03
JP 2019102764 A * 6/2019 ........... H05K 5/0226

* cited by examiner

*Primary Examiner* — Travis S Chambers
(74) *Attorney, Agent, or Firm* — HDLS IPR SERVICES; Chun-Ming Shih

(57) ABSTRACT

A control case with a cover controlled by pressing button (10) incudes: a case body (1) having a cable connecting zone (11) and multiple connectors (12); a cable protection cover (2) capable of sliding relative to the case body (1) to make the cable connecting zone (11) be covered or exposed; a button locking module (3) having a button (31) and a first latching tenon (32), the button (31) is extended with a second latching tenon (33) latched with the first latching tenon (32); and an automatic cover pushing module (4) having an elastic push rod (41) and an abutting part (42); the first latching tenon (32) and the second latching tenon (33) are separated by pressing the button (31) to make the elastic push rod (41) push the cable protection cover (2) to be separated from the case body (1).

14 Claims, 16 Drawing Sheets

CONTROL CASE WITH COVER CONTROLLED BY PRESSING BUTTON

BACKGROUND OF THE DISCLOSURE

Technical Field

The present disclosure relates to a control case, especially to a control case with a cover controlled by pressing button.

Description of Related Art

A related-art linear actuator applied in a lifting bed used in the medical or domestic field, an instrument used in the gym or rehabilitation facility, a domestic lifting desk or chair, a door opener and a window opener mainly utilize a motor as a power source, a transmission of a screw rod is used to link a retractable rod to perform a linear movement, and an object to be moved is fastened with the retractable rod to be moved with the retractable rod.

The related-art linear actuator is operated by a manual controller to output a control signal to a control case, the control case controls the retractable rod of the linear actuator to perform the linear movement. As such, a plurality of cable members is disposed in the control case, a cable protection cover is often provided for shielding and protecting the cable members, thus the cable members are prevented from being unstably positioned, generating frictions or being reeled in the screw rod, and the cable members being damaged or a pushing device be abnormally operated are avoided.

However, the related-art control case and the cable protection cover are engaged with a buckling manner, an opening corresponding to a buckle are formed at a lateral side of the cable protection cover; when the cable protection cover is desired to be separated from the control case, a tool is required to be inserted at the opening of the cable protection cover to lift the buckle to make the cable protection cover be removed. Especially, the control case used in a ward bed is disposed at a bottom side of the bed plate, thus a disadvantage of incontinently detaching the cable protection cover is caused and the related-art removing or separating manner shall be improved.

Accordingly, the applicant of the present disclosure has devoted himself for improving the mentioned shortages.

SUMMARY OF THE DISCLOSURE

The present disclosure is to provide a control case with a cover controlled by pressing button, in which a cable protection cover is automatically separated from a case body by pressing a button, thus the control case with the cover controlled by pressing button is provided with an advantage of making the cable protection cover be conveniently removed.

Accordingly, the present disclosure provides a control case with a cover controlled by pressing button, which includes: a case body having a cable connecting zone and a plurality of connectors disposed in the cable connecting zone; a cable protection cover capable of sliding relative to the case body to make the cable connecting zone be covered or exposed; a button locking module including a button disposed in the case body and a first latching tenon extended from the cable protection cover, wherein the button is extended with a second latching tenon mutually latched with the first latching tenon; and an automatic cover pushing module having an elastic push rod disposed on the cable protection cover and an abutting part disposed on the case body, wherein the elastic push rod abuts against the abutting part; wherein, the first latching tenon and the second latching tenon are driven to be separated by pressing the button, thus the elastic push rod pushes the cable protection cover to be separated from the case body via the abutting part.

Advantages achieved by the present disclosure are as follows. No tool is required to remove the cable protection cover, the user only needs to press the button to make the cable protection cover be automatically away from the case body to expose the cable connecting zone and the plurality of cable members, thus an advantage of making the cable protection cover be conveniently separated and/or assembled with the control case with the cover controlled by pressing button without requiring any auxiliary tool is provided.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
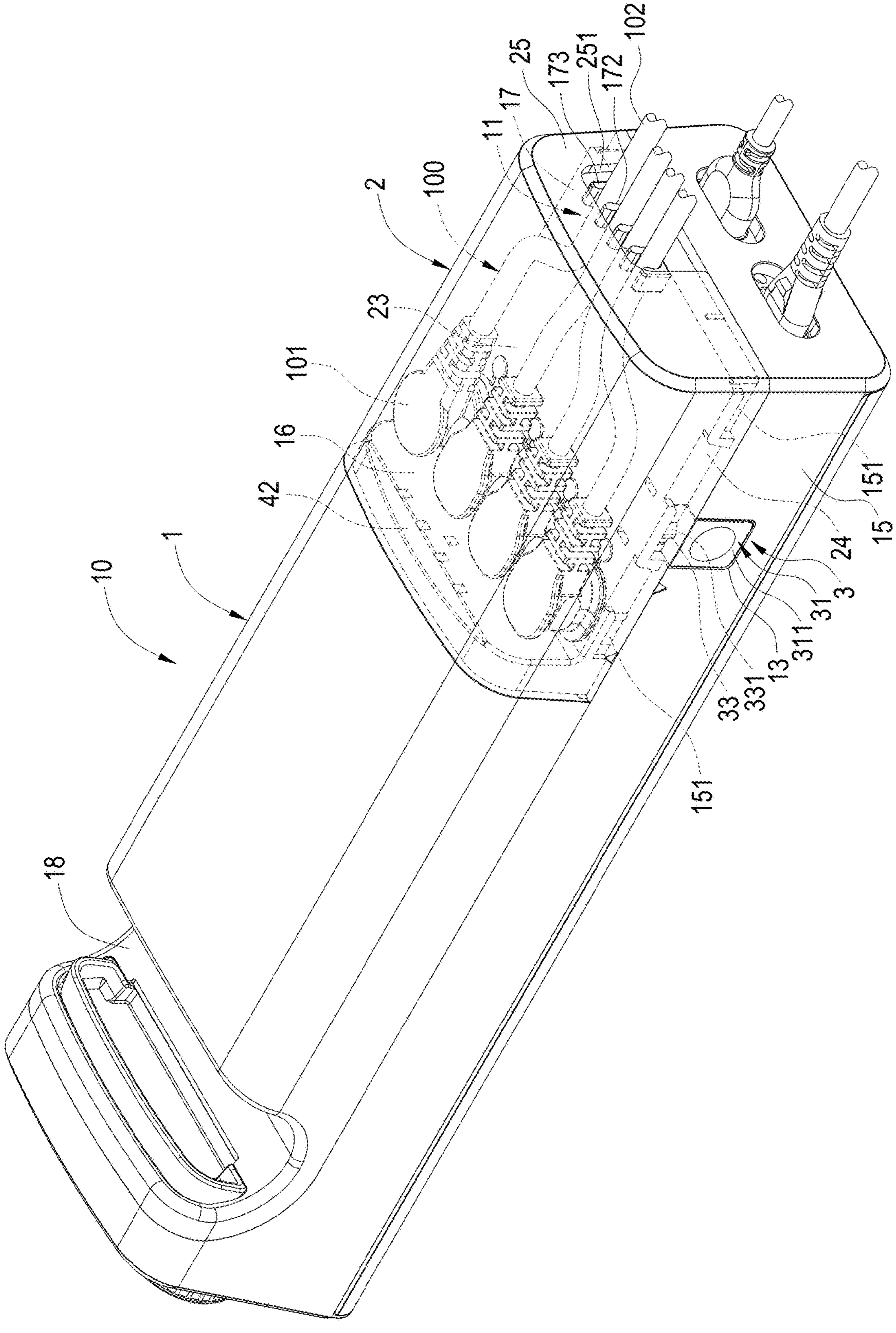
FIG. 1 is a perspective view showing an operating status of the control case with the cover controlled by pressing button according to the present disclosure.
Figure 2:
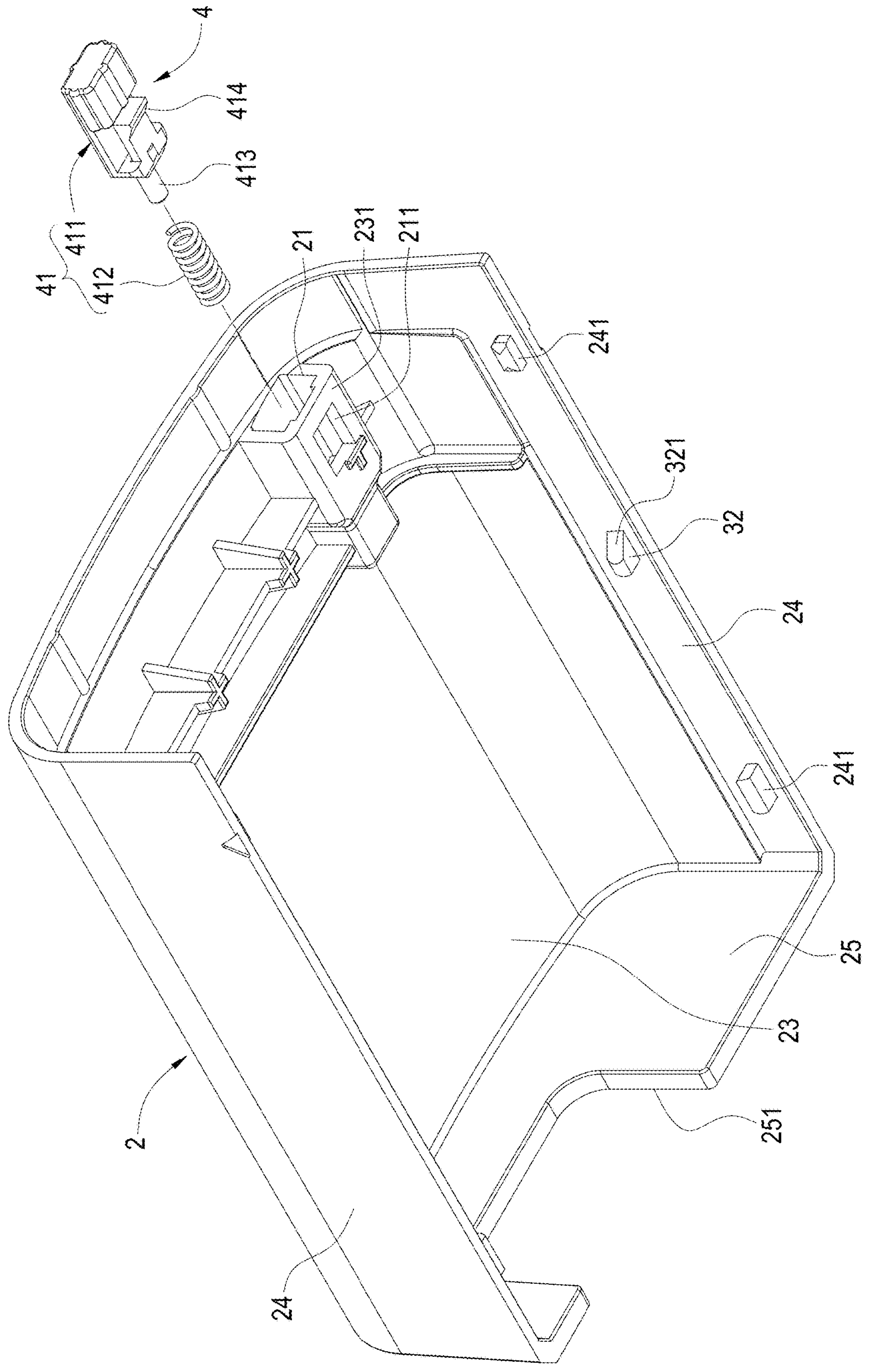
FIG. 2 is a perspective exploded view showing the cable protection cover and the elastic push rod according to the present disclosure.
Figure 3:
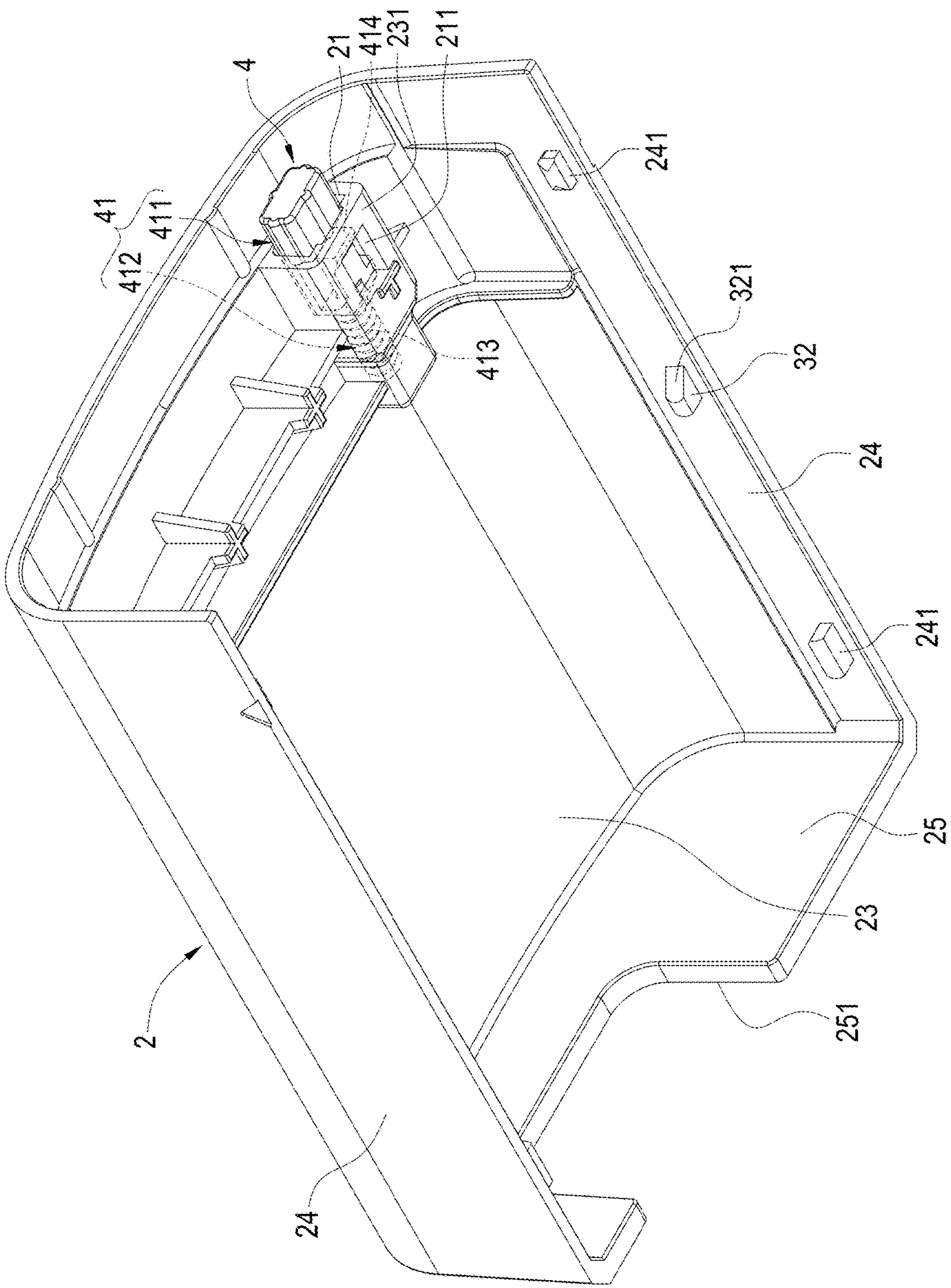
FIG. 3 is a perspective view showing the assembly of the cable protection cover and the elastic push rod according to the present disclosure.
Figure 4:
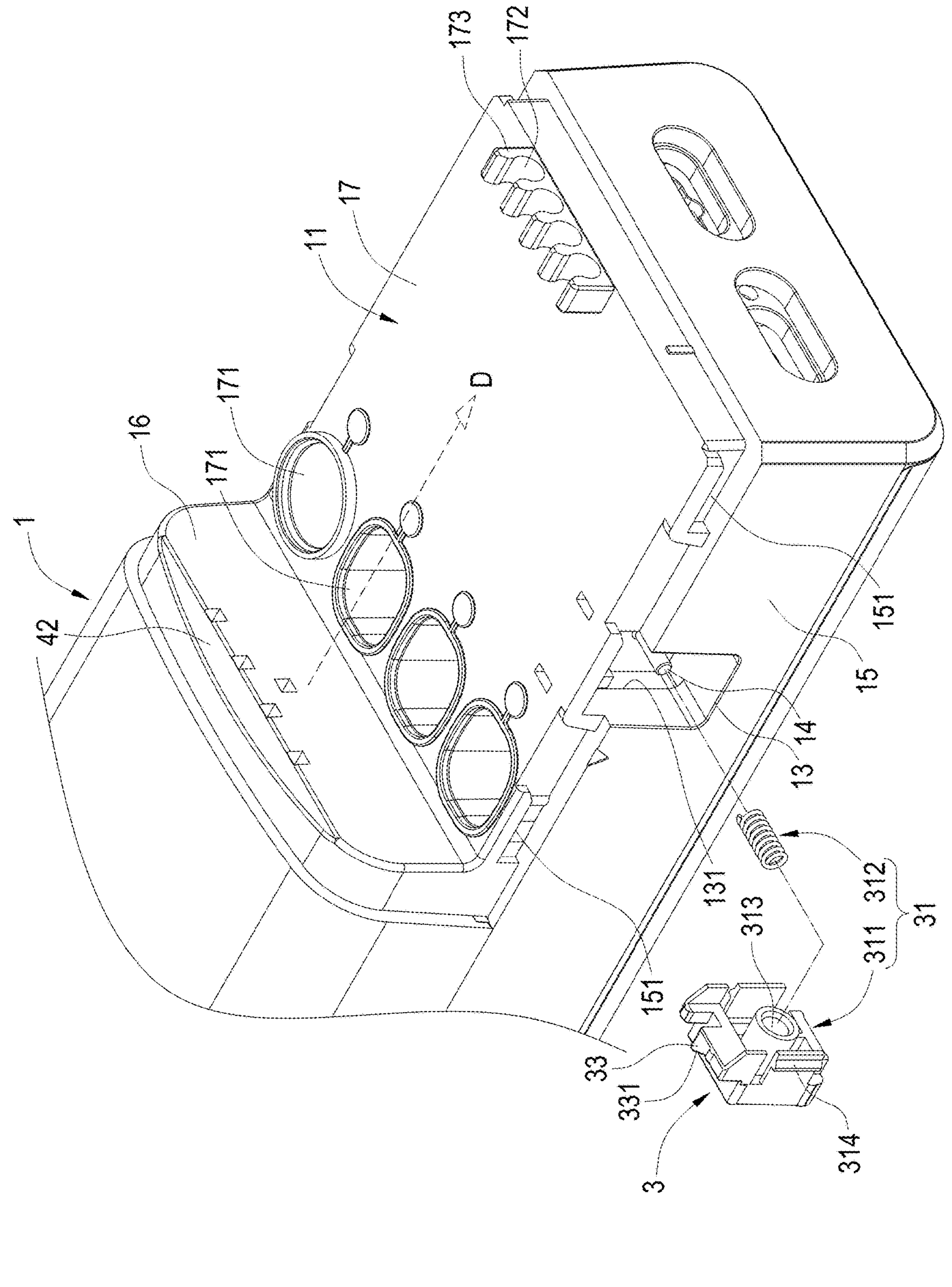
FIG. 4 is a perspective exploded view showing the case body and the button according to the present disclosure.
Figure 5:
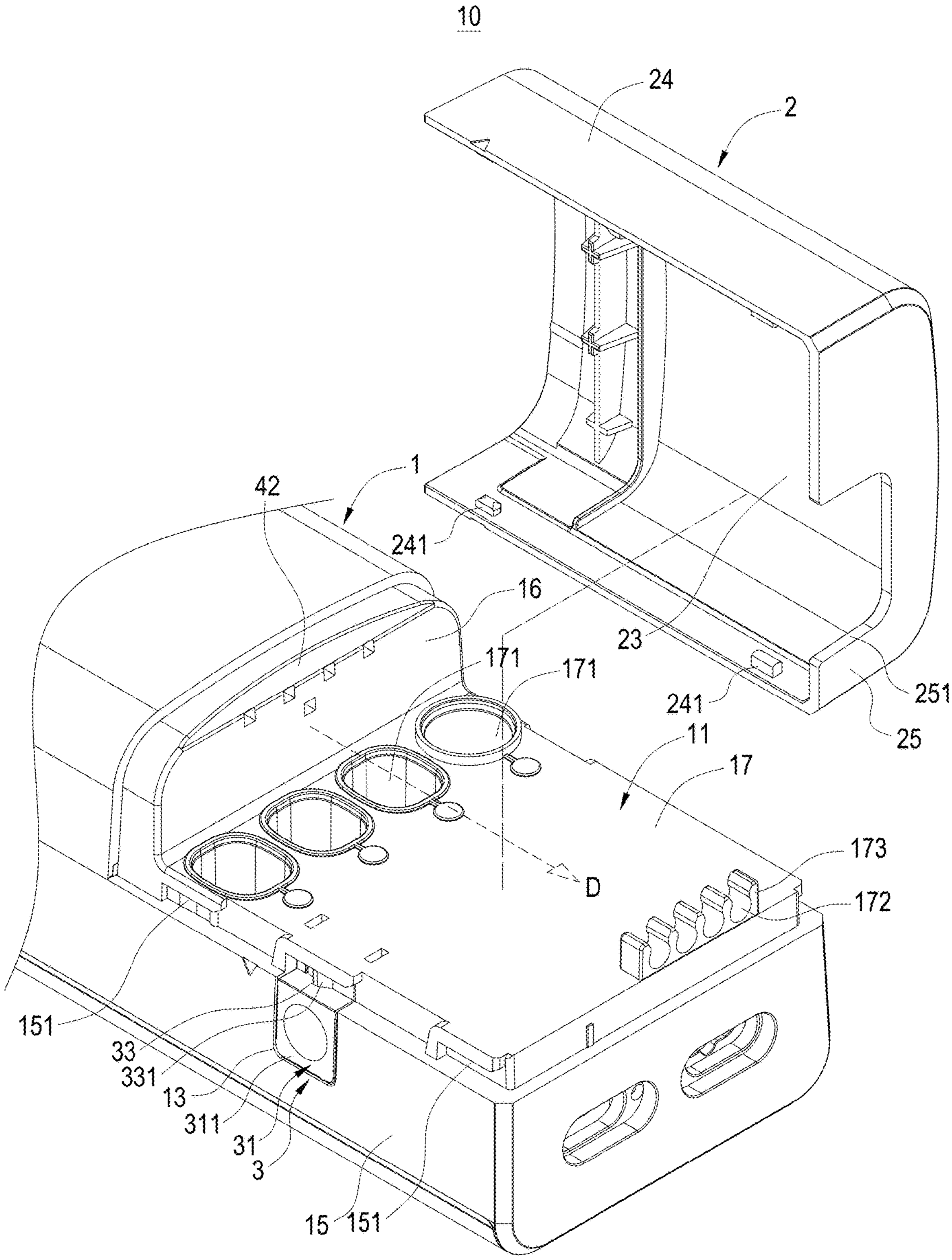
FIG. 5 is a perspective view showing the assembly of the case body and the button and a perspective exploded view showing the case body and the cable protection cover according to the present disclosure.
Figure 6:
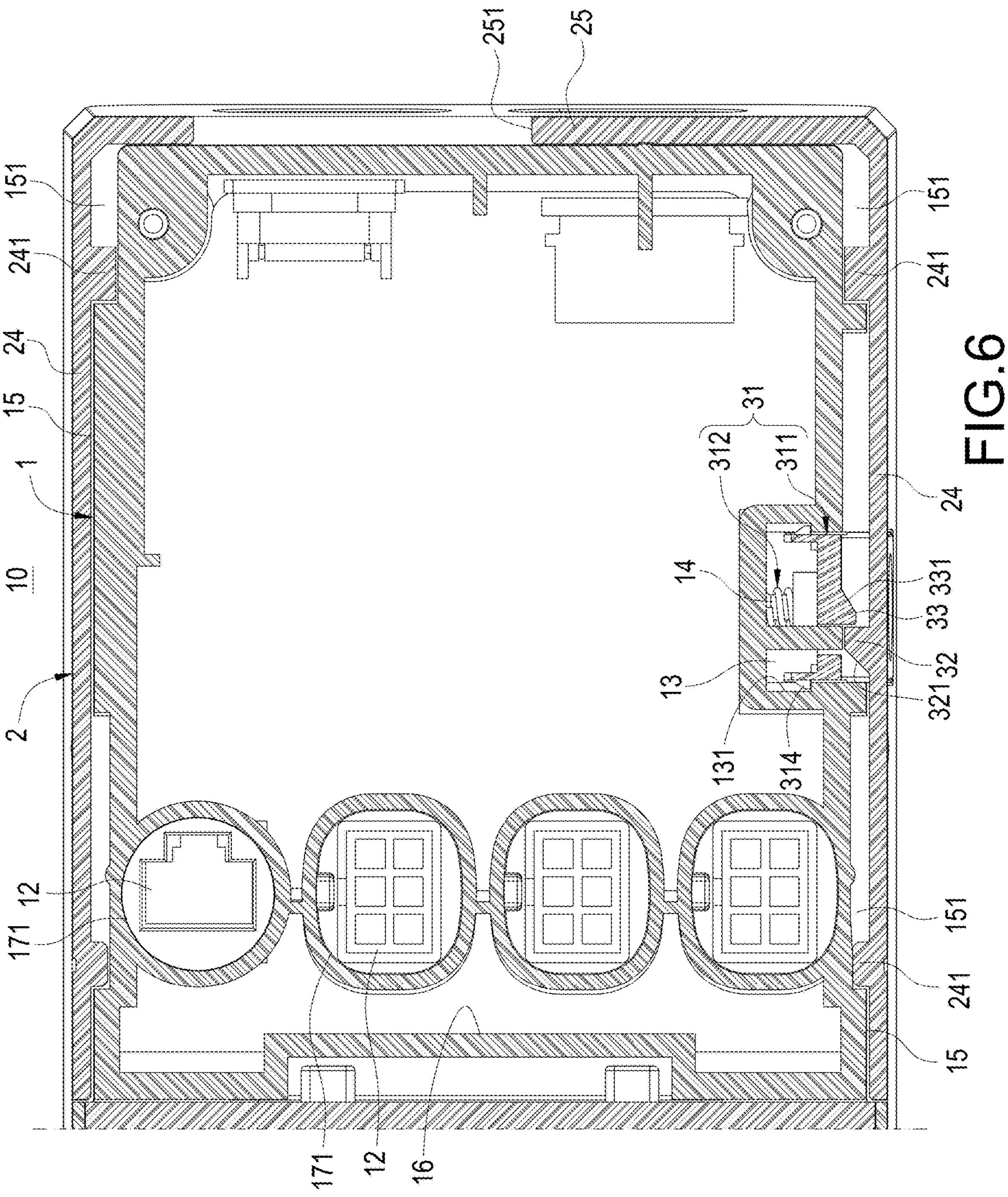
FIG. 6 is a cross sectional view showing a first operating status of the button locking module according to the present disclosure.
Figure 7:
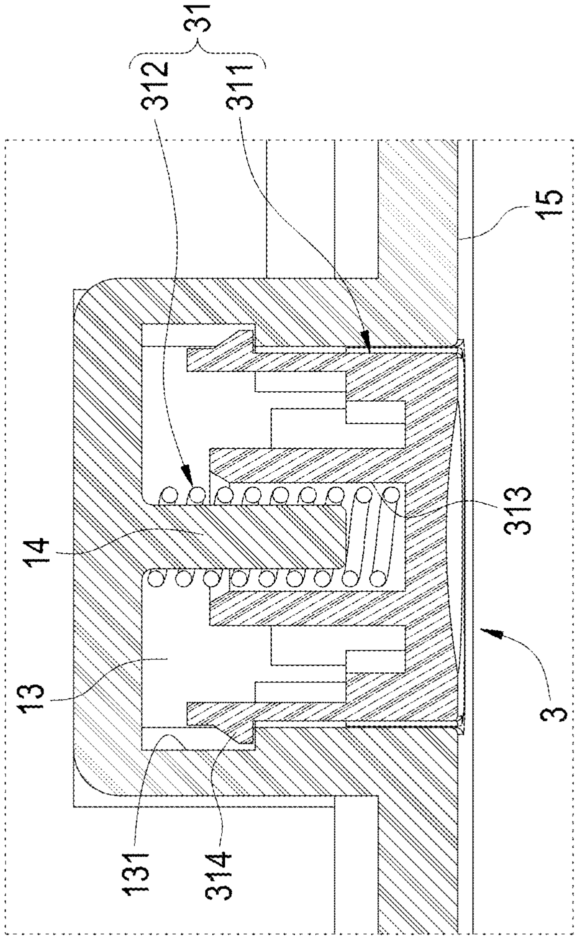
FIG. 7 is a partially enlarged cross sectional view showing the button locking module according to the present disclosure.
Figure 8:
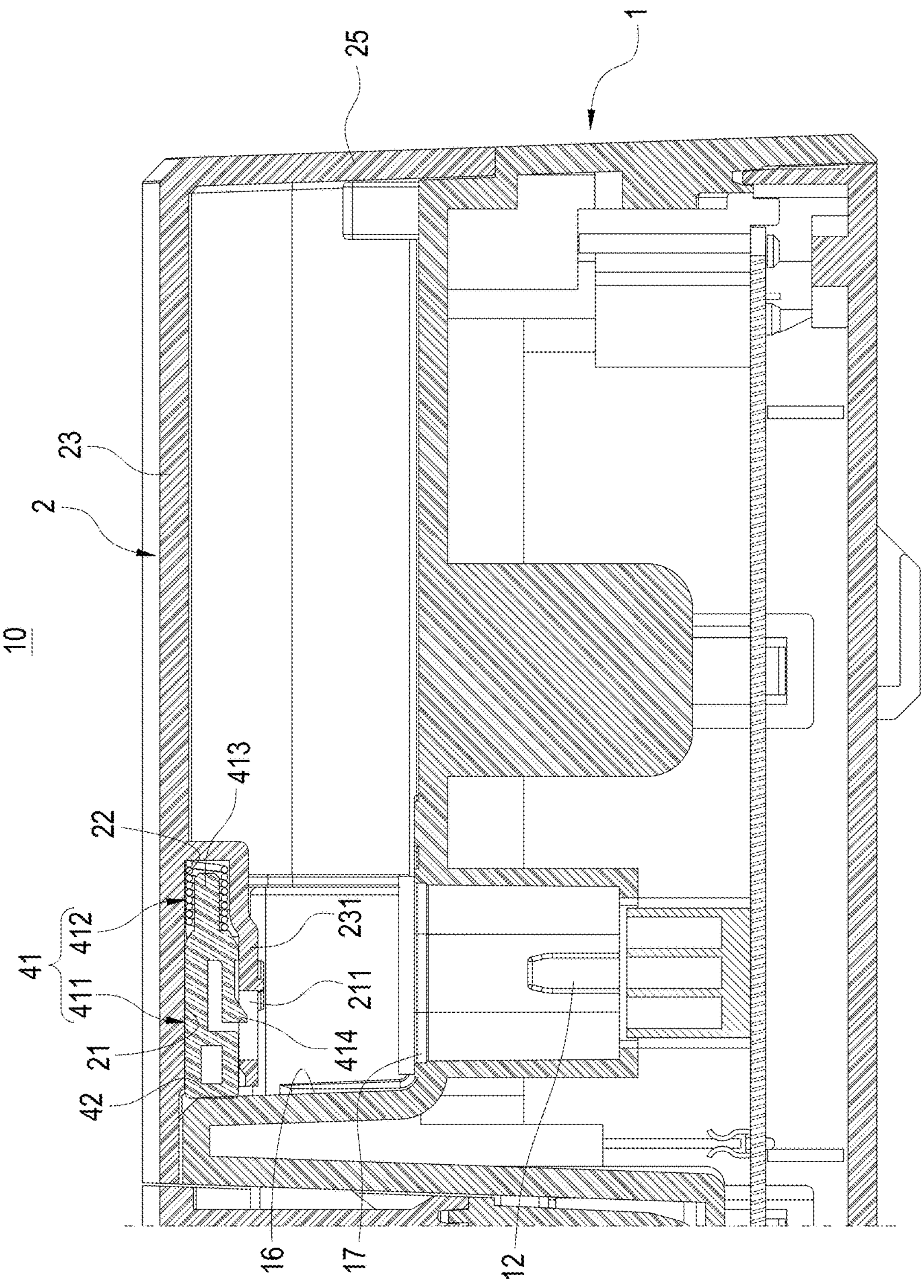
FIG. 8 is a cross sectional view showing a first operating status of the automatic cover pushing module according to the present disclosure.
Figure 9:
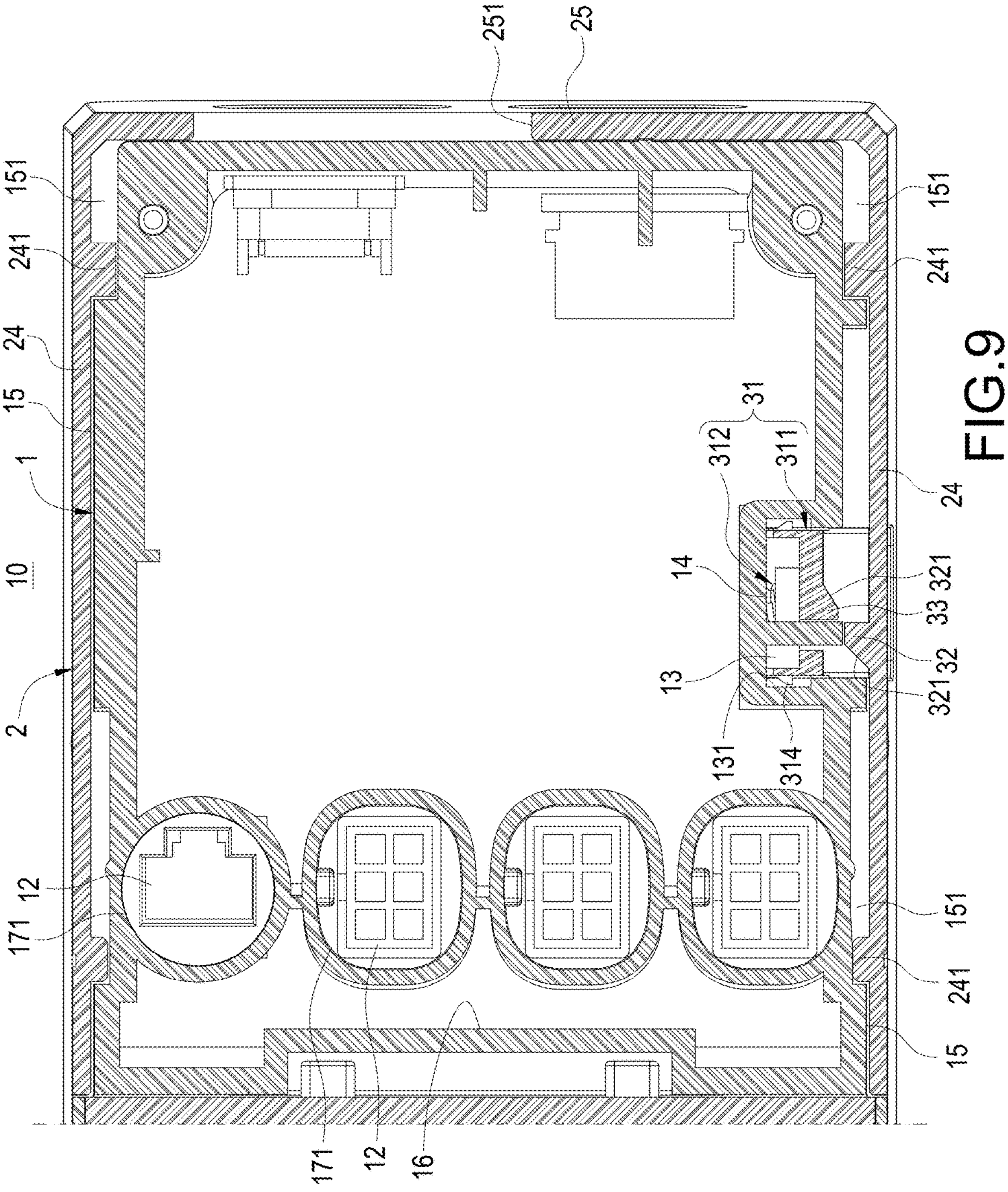
FIG. 9 is a cross sectional view showing a second operating status of the button locking module according to the present disclosure.
Figure 10:
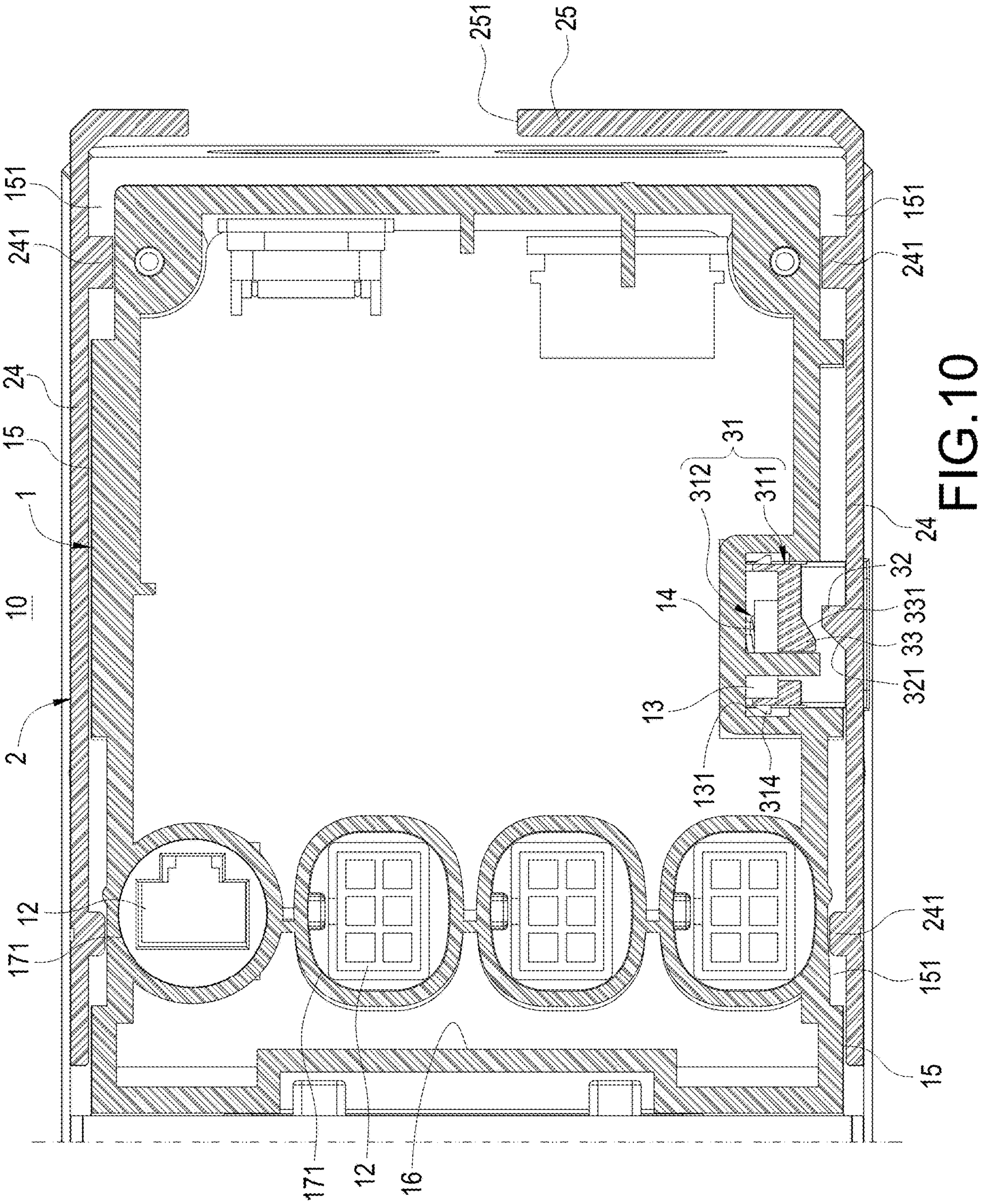
FIG. 10 is a cross sectional view showing a third operating status of the button locking module according to the present disclosure.
Figure 11:
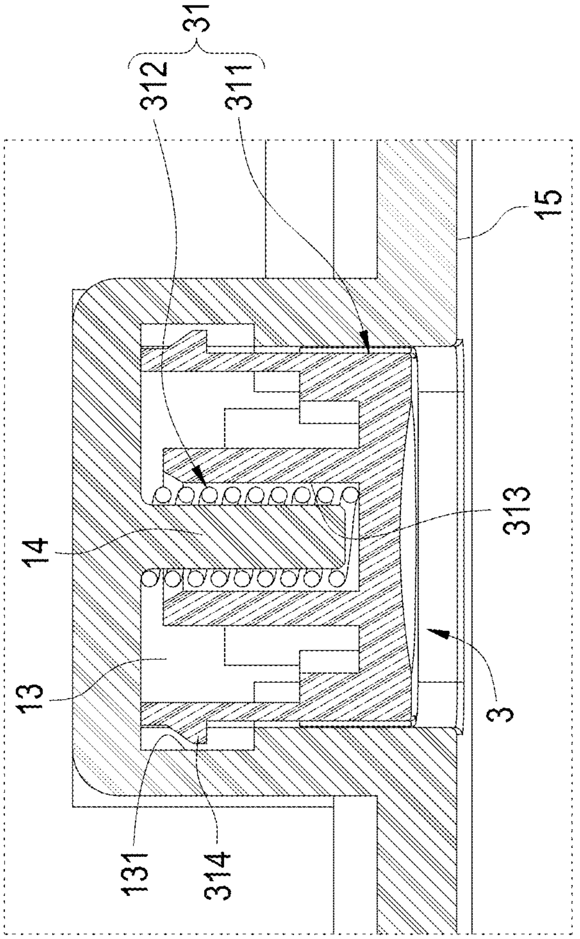
FIG. 11 is another partially enlarged cross sectional view showing the button locking module according to the present disclosure.
Figure 12:
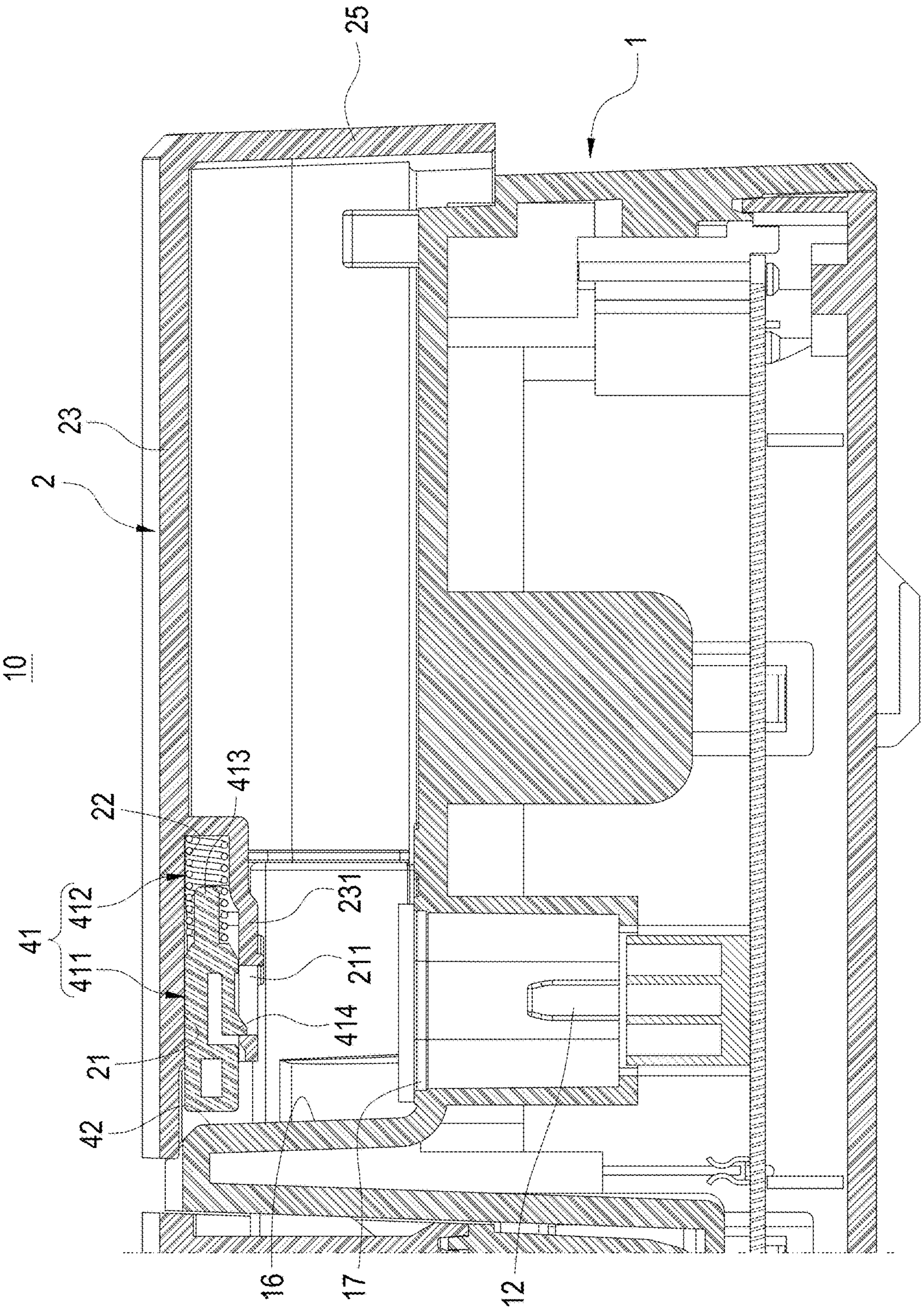
FIG. 12 is a cross sectional view showing a second operating status of the automatic cover pushing module according to the present disclosure.
Figure 13:
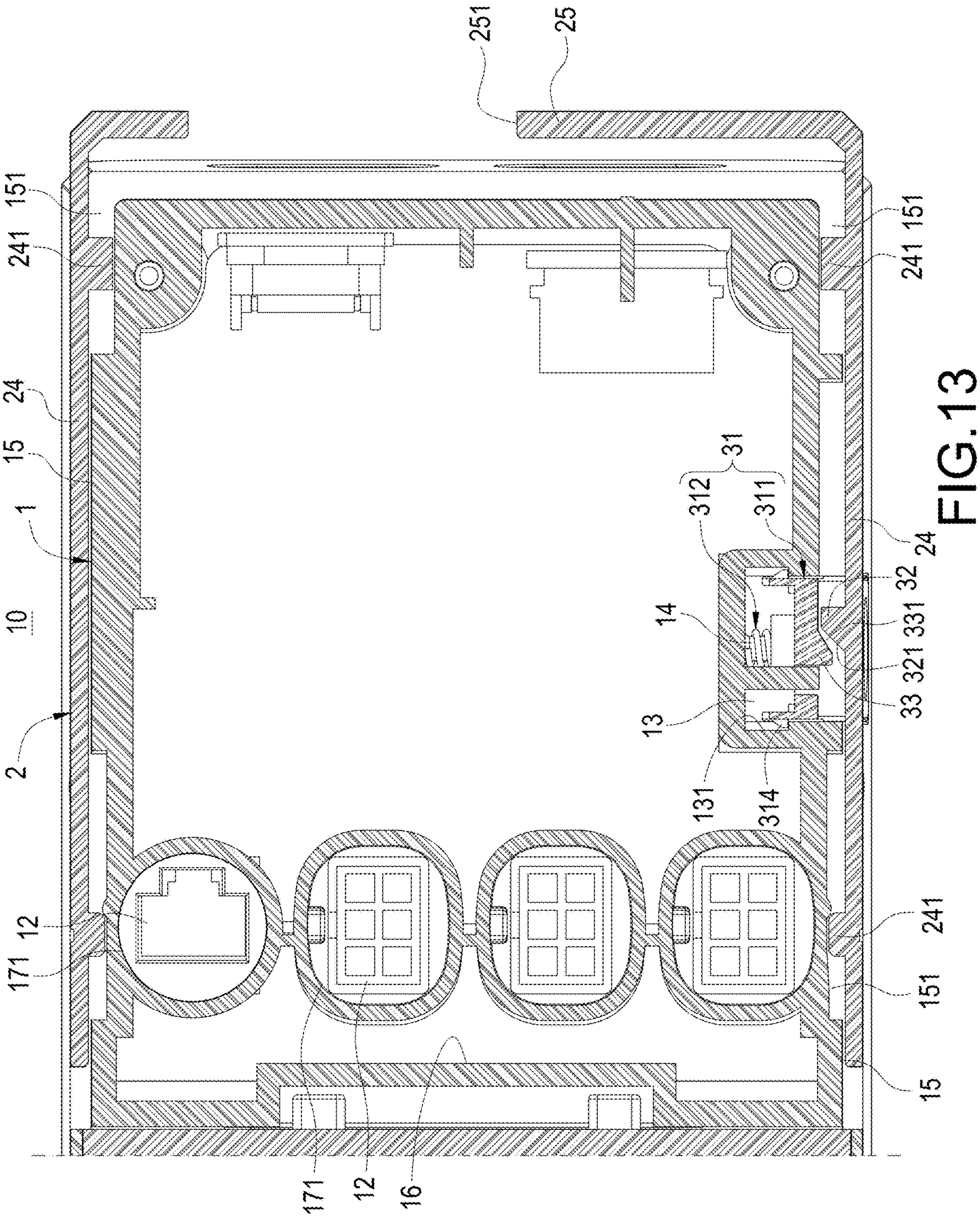
FIG. 13 is a cross sectional view showing a fourth operating status of the button locking module according to the present disclosure.
Figure 14:
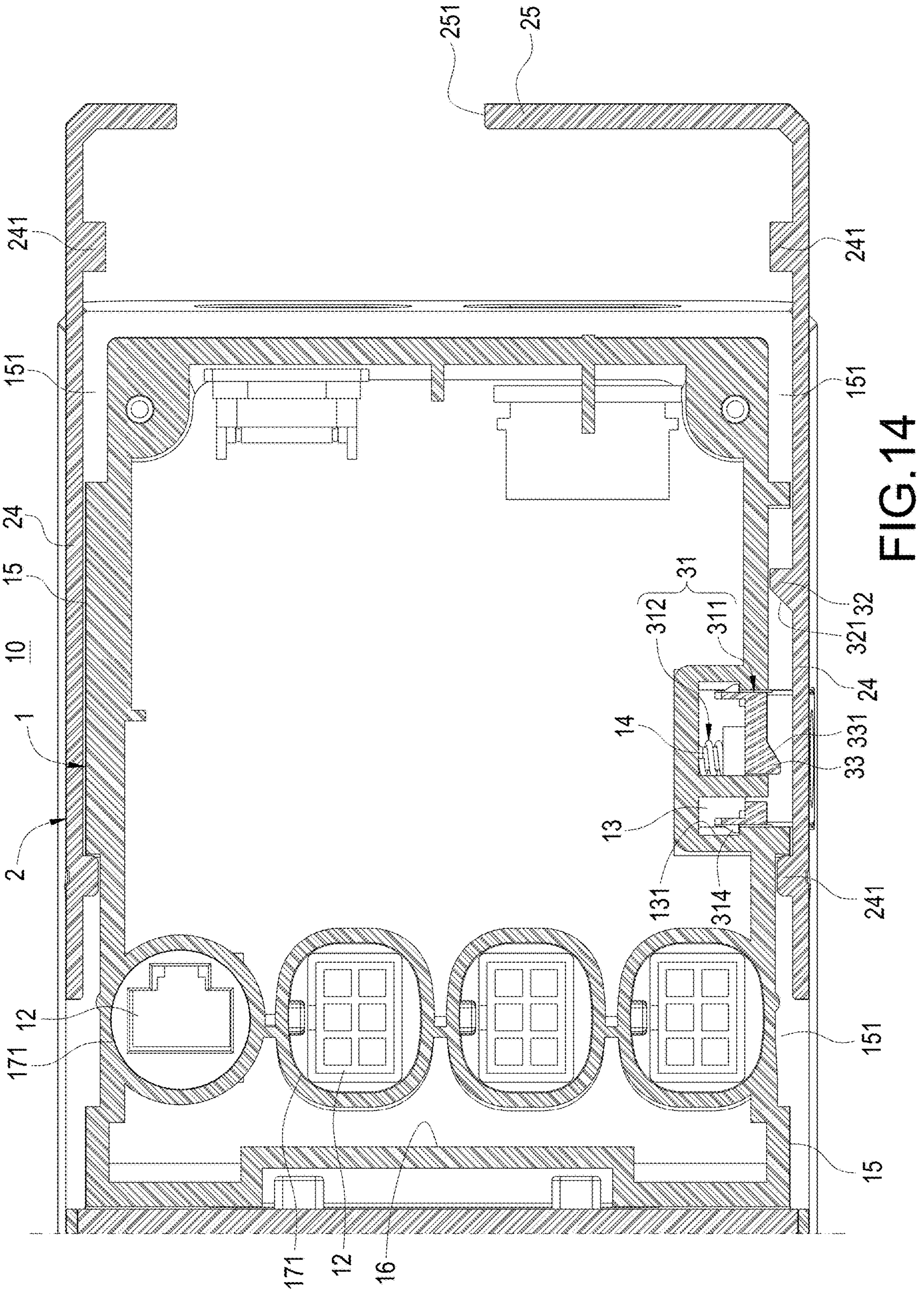
FIG. 14 is a cross sectional view showing a fifth operating status of the button locking module according to the present disclosure.
Figure 15:
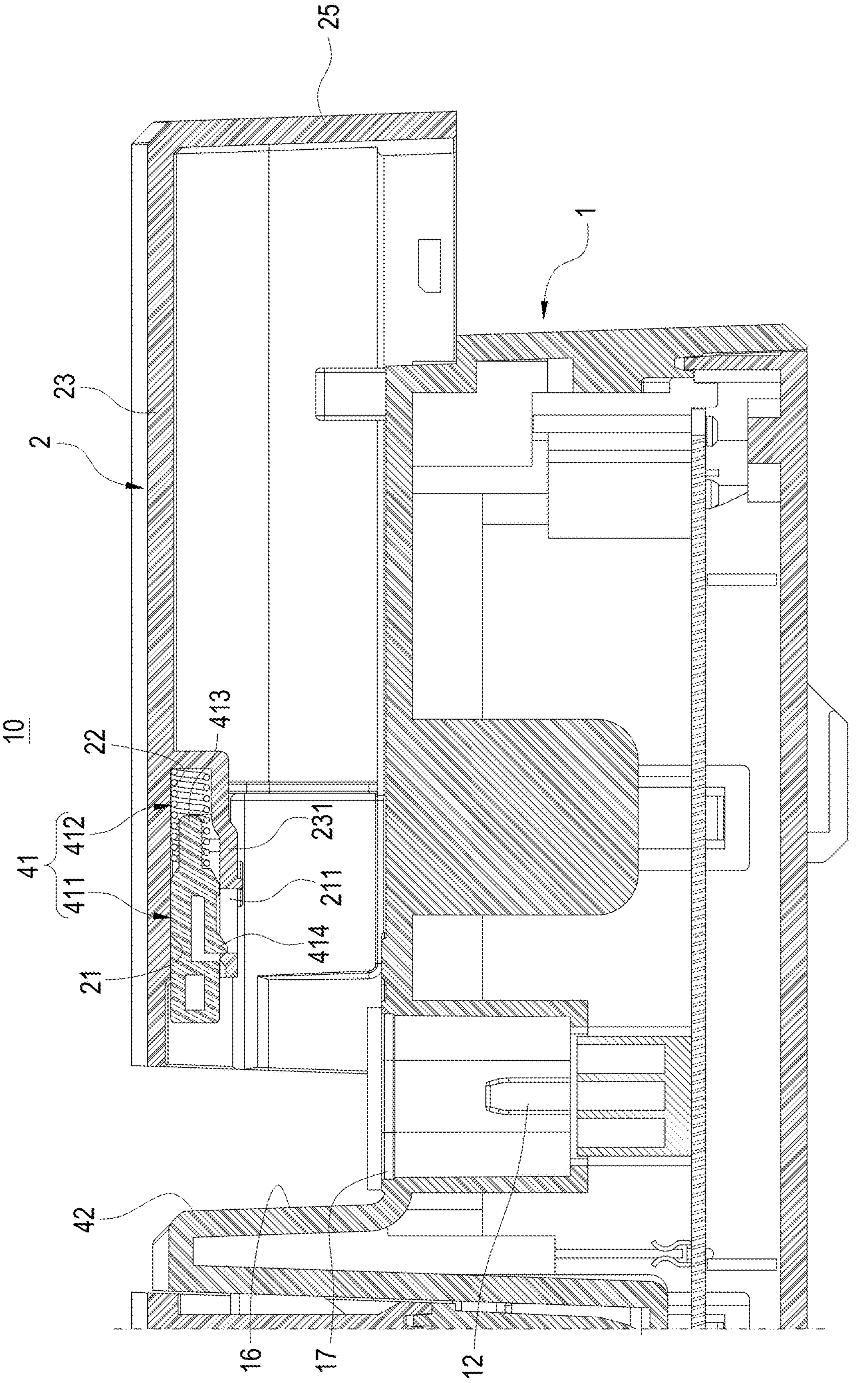
FIG. 15 is a cross sectional view showing a third operating status of the automatic cover pushing module according to the present disclosure.
Figure 16:
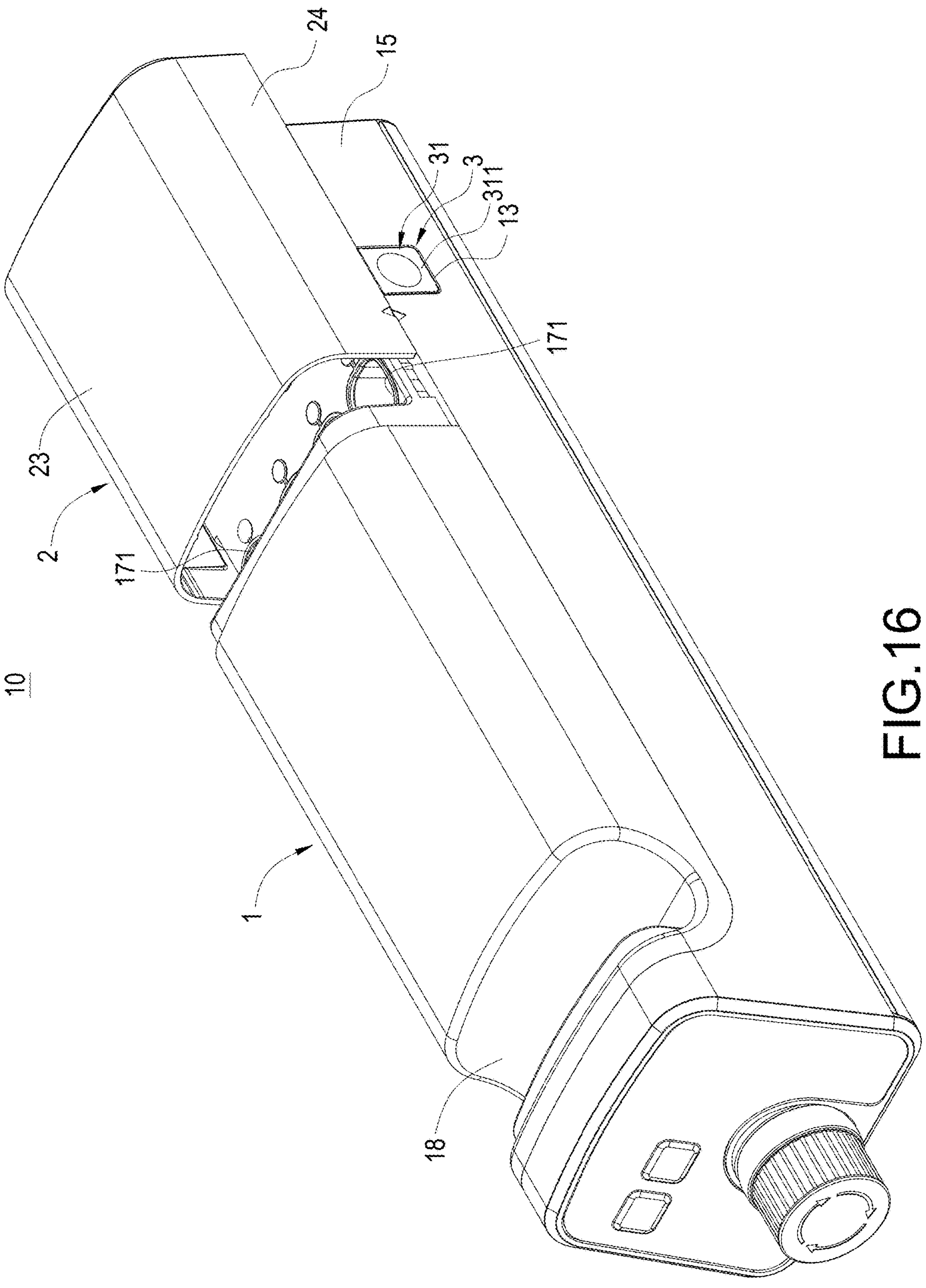
FIG. 16 is a perspective view showing another operating status of the control case with the cover controlled by pressing button according to the present disclosure.

Please refer from FIG. 1 to FIG. 16, the present disclosure provides a control case 10 with a cover controlled by pressing button. A plurality of cable members 110 are inserted in the control case with the cover controlled by pressing button 10. Each of cable members 100 has a joint 101 and a cable 102. The control case 10 with the cover controlled by pressing button mainly includes a case body 1, a cable protection cover 2, a button locking module 3 and an automatic cover pushing module 4.

As shown in FIG. 1, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16, the case body 1 is, for example, a control box having an electric cylinder or a pushing device (not shown in figures), thus the cable members 100 are used to electrically connect the control box and the aforesaid electric cylinder or the pushing device. Electronic units (not shown in figures), for example an electric circuit board and a processor, are disposed in the control box. An operation panel (not shown in figures) is disposed at an outer side of the control box. The case body 1 has a cable connecting zone 11 and a plurality of connectors 12 disposed in the cable connecting zone 11. Each of the joints 101 is inserted in each of the connectors 12. The case body 1 has a first recess slot 13 and a first convex rod 14 extended from a bottom wall of the first recess slot 13. Two first latching slots 131 are formed at two sides of an inner peripheral wall of the first recess slot 13.

Details are provided as follows. The case body 1 has two first lateral walls 15 disposed at a left side and a right side of the cable connecting zone 11 and a front wall 16 disposed at a front side of the cable connecting zone 11. The first recess slot 13 is formed at one of the first lateral walls 15. An axial direction D is defined by the front wall 16. The two first lateral walls 15 are disposed with a plurality of slide rails 151 along the axial direction D.

The cable connecting zone 11 is a recessed zone 17 concavely formed at one side of a top end of the case body 1, and a hand holding part 18 is formed at another side of the top end of the case body 1. The hand holding part 18 is used to make a user hold the case body 1. The recessed zone 17 has a plurality of inserting ports 171 and a plurality of cable mounting slots 172. The recessed zone 17 is protruded with a continuous U-shaped convex sheet 173. The plurality of cable mounting slots 172 are formed in U-shaped openings of the continuous U-shaped convex sheet 173.

Please refer from FIG. 1 to FIG. 16, the cable protection cover 2 slides relative to the case body 1 to make the cable connecting zone 11 and the plurality of cable members 100 be covered or exposed. The cable protection cover 2 has a second recess slot 21 and a second penetrated hole 22 disposed at a bottom wall of the second recess slot 21. A second latching slot 211 is formed on an inner peripheral wall of the second recess slot 21.

Details are provided as follows. The cable protection cover 2 has a top wall 23 and two second lateral walls 24 disposed at a left side and a right side of the top wall 23. A protrusion 231 is protruded from a bottom end of the top wall 23. The second recess slot 21 is concavely formed at one side of the protrusion 231 corresponding to the front wall 16. The two second lateral walls 24 are protruded with a plurality of slide pieces 241. Each of the slide pieces 241 slides along each of the slide rails 151, thus the cable protection cover 2 slides relative to the case body 1 to be away or close to the front wall 16 along the axial direction D.

The cable protection cover 2 further has a rear wall 25 disposed at a rear side of the top wall 23. The plurality of cable mounting slots 172 are disposed between the plurality of inserting ports 171 and the rear wall 25. The rear wall 25 has a cable exposing port 251. Each of the connectors 12 is disposed in each of the inserting ports 171, thus each of the joints 101 is inserted in each of the inserting ports 171 to be electrically connected to each of the connectors 12. Each of the cables 102 passes each of the cable mounting slots 172 and the cable exposing port 251, thus the cables 102 are compactly distributed and arranged via the cable mounting slots 172 and the cable exposing port 251.

As shown in FIG. 1, FIG. 2, FIG. 3, FIG. 4, FIG. 5, FIG. 6, FIG. 7, FIG. 9, FIG. 10, FIG. 11, FIG. 13, FIG. 14 and FIG. 16, the button locking module 3 includes a button 31 disposed in one of the case body 1 and the cable protection cover 2, and a first latching tenon 32 correspondingly extended from the cable protection cover 2 and the case body 1. The button 31 is extended with a second latching tenon 33 mutually latched with the first latching tenon 32.

Details are provided as follows. In some embodiments, the first latching tenon 32 is protruded from one of the second lateral walls 24, in other words, the first latching tenon 32 is extended from the cable protection cover 2. The button 31 includes a button member 311 and a first spring 312. The button member 311 has a first penetrated hole 313. The button member 311 is mounted in the first recess slot 13. The first convex rod 14 passes the first penetrated hole 313. The first spring 312 sheathes and elastically supports between the first convex rod 14 and the first penetrated hole 313, in other words, the first spring 312 is disposed between the button member 311 and the case body 1.

In some embodiments, the disposed locations of the first latching tenon 32, the first recess slot 13 and the button 31 are not intended to be limiting. The first latching tenon 32 may be extended from the case body 1, the first recess lot 13 is formed in the cable protection cover, thus the first spring 312 is disposed between the button member 311 and the cable protection 2 cover 2 to make the first spring 312 be disposed between button member 311 and the cable protection cover 2.

Two first elastic hooks 314 are extended from two opposite sides of the button member 311. The two first elastic hooks 314 are slidably latched in the two first latching slots 131, thus the button member 311 is stably disposed in the first recess slot 13 and exposed or retracted relative to the first recess slot 13 via the two first elastic hooks 314.

The first latching tenon 32 has a first inclined surface 321 having a thickness thereof gradually increased in a direction towards the front wall 16 and along the axial direction D. The second latching tenon 33 has a second inclined surface 331 having a thickness thereof gradually increased in a direction away from the front wall 16 and along the axial direction D. When the cable protection cover 2 slides relative to the case body 1 along the axial direction D and with a manner of being closer to the front wall 16, the first inclined surface 321 and the second inclined surface 331 gradually abuts against each other, and the button member 311 is driven to be retracted into the first recess slot 13; after the locations of the first inclined surface 321 and the second inclined surface 331 are relatively interchanged, the first spring 312 drives the button member 311 to be recovered towards a location of exposing in the first recess slot 13, thus the first latching tenon 32 and the second latching tenon 33 are mutually latched. At this moment, the cable protection cover 2 covers the cable connecting zone 11, the case body 1 and the cable protection cover 2 are formed in a tightly locking status, thus the user needs to press the button member 311 to release the cable protection cover 2.

As shown in FIG. 1, FIG. 2, FIG. 3, FIG. 4, FIG. 5, FIG. 8, FIG. 12 and FIG. 15, the automatic cover pushing module 4 includes an elastic push rod 41 disposed in one of the case body 1 and the cable protection cover 2, and an abutting part 42 correspondingly disposed in the cable protection cover 2 and the case body 1. The elastic push rod 41 abuts against the abutting part 42.

Details are provided as follows. In some embodiments, the abutting part 42 is formed on a surface of the front wall 16, in other words the abutting part 42 is formed on the case body 1. The elastic push rod 41 includes a push rod member 411 and a second spring 412. The push rod member 411 is extended with a second convex rod 413. The push rod member 411 is mounted in the second recess slot 21. The second convex rod 413 passes the second penetrated hole 22. The second spring 412 sheathes and elastically supports between the second convex rod 413 and the second penetrated hole 22, in other words the second spring 412 is disposed between the push rod member 411 and the cable protection cover 2.

In some embodiments, the disposed locations of the abutting part 42, the second recess slot 21 and the elastic push rod 41 are not intended to be limiting. The abutting part 42 may be formed on the cable protection cover 2, the second recess slot 21 may be formed on the case body 1, thus the second spring 412 is disposed between the push rod member 411 and the case body 1.

A second elastic hook 414 is extended from the push rod member 411. The second elastic hook 414 is slidably latched in the second latching slot 211, thus the push rod member 411 is stably disposed in the second recess slot 21 and protruded or retracted relative to the second recess slot 21 via the second elastic hook 414.

When the user presses the button 31 to make the button member 311 retract into the first recess slot 13, the button member 311 drives the first latching tenon 32 and the second latching tenon 33 to be separated to make the cable protection cover 2 be released. At this moment, the second spring 412 drives the push rod member 411 to be recovered towards a location of protruding from the second recess slot 21 and abut against the abutting part 42, thus the elastic push rod 41 pushes the cable protection cover 2 to be separated from the case body 1 via the abutting part 42. Accordingly, an effect of automatically releasing the cable protection cover 2 to make the cable connecting zone 11 be exposed is achieved.

Please refer to FIG. 1, FIG. 6, FIG. 7 and FIG. 8, which disclose an operating status of the control case with the cover controlled by pressing button 10. The plurality of cable members 100 are accommodated in the cable connecting zone 11, and the plurality of cable members 100 are covered and protected by the cable protection cover 2. When the cable protection cover 2 is desired to be assembled with the case body 1, the first latching tenon 32 is moved towards the second latching tenon 33 to make the first inclined surface 321 and the second inclined surface 331 gradually abut against each other, the button member 311 is driven to retract into the first recess slot 13; after the locations of the first inclined surface 321 and the second inclined surface 331 are relatively interchanged, the first spring 312 drives the button member 311 to be recovered towards the location of exposing in the first recess slot 13, thus the first latching tenon 32 and the second latching tenon 33 are mutually latched for blocking, and the cable protection cover 2 and the case body 1 are tightly locked and fastened At this moment, the cable protection cover 2 completely covers the cable connecting zone 11, the abutting part 42 presses the push rod member 411 and compresses the second spring 412 to be retracted into the second recess slot 21, and the user needs to press the button member 311 to release the cable protection cover 2.

Please refer to FIG. 1, FIG. 9, FIG. 10, FIG. 11, FIG. 12, FIG. 13, FIG. 14, FIG. 15 and FIG. 16, which disclose another operating status of the control case with the cover controlled by pressing button 10. When the cable protection cover 2 is desired to be separated from the case body 1, the user presses the button member 311 to retract into the first recess slot 13 to make the first latching tenon 32 and the second latching tenon 33 be unlatched, the push rod member 411 is no longer pressed and the second spring 412 is no longer compressed to retract into the second recess slot 21 due to the cable protection cover 2 being released, thus the second spring 412 drives the push rod member 411 to be recovered towards the location of protruding from the second recess slot 21 and abut against the abutting part 42, meanwhile the cable protection cover 2 is automatically away from the case body 1 to make the cable connecting zone 11 and the plurality of cable members 100 be exposed. Accordingly, an effect of making the cable protection cover 2 be automatically released is achieved.

Based on what has been disclosed above, no tool is required to remove the cable protection cover 2, the user only needs to press the button 31 to make the cable protection cover 2 be automatically away from the case body 1 to expose the cable connecting zone 11 and the plurality of cable members 100, thus an advantage of making the cable protection cover 2 be conveniently separated and/or assembled with the control case with the cover controlled by pressing button 10 without requiring any auxiliary tool is provided.

While this disclosure has been described by means of specific embodiments, numerous modifications and variations could be made thereto by those skilled in the art without departing from the scope and spirit of this disclosure set forth in the claims.

What is claimed is:

1. A control case, comprising:

a case body (1), comprising a cable connecting zone (11) and a plurality of connectors (12) disposed in the cable connecting zone (11);

a cable protection cover (2), slidable with respect to the case body (1) to cover or expose the cable connecting zone (11);

a button locking module (3), comprising a button (31) disposed in the case body (1) and a first latching tenon (32) extended from the cable protection cover (2), wherein the button (31) comprises a second latching tenon (33) extended therefrom and mutually latched with the first latching tenon (32); and an automatic cover pushing module (4), comprising an elastic push rod (41) disposed on the cable protection cover (2) and an abutting part (42) disposed on the case body (1), wherein the elastic push rod (41) abuts against the abutting part (42);

wherein, when the button (31) is pressed, the first latching tenon (32) and the second latching tenon (33) are driven to be separated to make the elastic push rod (41) push the cable protection cover (2) via the abutting part (42) to separate the cable protection cover (2) from the case body (1).

2. The control case according to claim 1, wherein the button (31) comprises a button member (311) and a first spring (312), and the first spring (312) is disposed between the button member (311) and the case body (1).

3. The control case according to claim 2, wherein the case body (1) comprises a first recess slot (13) and a first convex rod (14) extended from a bottom wall of the first recess slot (13), the button member (311) comprises a first penetrated hole (313), the button member (311) is mounted in the first recess slot (13), the first convex rod (14) passes through the first penetrated hole (313), the first spring (312) sheathes and elastically supports between the first convex rod (14) and the first penetrated hole (313).

4. The control case according to claim 3, wherein two first latching slots (131) are defined on two sides of an inner peripheral wall of the first recess slot (13), two first elastic hooks (314) are extended from two sides of the button member (311) opposite to each other, and the two first elastic hooks (314) are slidably latched in the two first latching slots (131).

5. The control case according to claim 3, wherein the case body (1) comprises two first lateral walls (15) disposed at a left side and a right side of the cable connecting zone (11), the first recess slot (13) is defined on one of the first lateral walls (15), the cable protection cover (2) comprises a top wall (23) and two second lateral walls (24) disposed at a left side and a right side of the top wall (23), and the first latching tenon (32) protrudes from one of the second lateral walls (24).

6. The control case according to claim 5, wherein the case body (1) comprises a front wall (16) disposed at a front side of the cable connecting zone (11), an axial direction (D) is defined by the front wall (16), a plurality of slide rails (151) are disposed on the two first lateral walls (15) along the axial direction (D), a plurality of slide pieces (241) are disposed protrusively on the two second lateral walls (24), each of the slide pieces (241) is configured to slide along each of the slide rails (151) to make the cable protection cover (2) slide away from or close to the front wall (16) relative to the case body (1).

7. The control case according to claim 6, wherein the first latching tenon (32) comprises a first inclined surface (321) with a thickness gradually increased along the axial direction (D) towards the front wall (16), and the second latching tenon (33) comprises a second inclined surface (331) with a thickness gradually increased along the axial direction (D) away from the front wall (16).

8. The control case according to claim 1, wherein the abutting part (42) is disposed on the case body (1), the elastic push rod (41) comprises a push rod member (411) and a second spring (412), and the second spring (412) is disposed between the push rod member (411) and the cable protection cover (2).

9. The control case according to claim 8, wherein the cable protection cover (2) comprises a second recess slot (21) and a second penetrated hole (22) disposed at a bottom wall of the second recess slot (21), the push rod member (411) comprises a second convex rod (413) extended therefrom, the push rod member (411) is mounted in the second recess slot (21), the second convex rod (413) passes through the second penetrated hole (22), and the second spring (412) sheathes and elastically supports between the second convex rod (413) and the second penetrated hole (22).

10. The control case according to claim 9, wherein a second latching slot (211) is defined on an inner peripheral wall of the second recess slot (21), a second elastic hook (414) comprises the push rod member (411) extended therefrom, and the second elastic hook (414) is slidably latched in the second latching slot (211).

11. The control case according to claim 9, wherein the case body (1) comprises a front wall (16) disposed at a front side of the cable connecting zone (11), the abutting part (42) is disposed on a surface of the front wall (16), the cable protection cover (2) comprises a top wall (23), a protrusion (231) is disposed protrusively from a bottom end of the top wall (23), and the second recess slot (21) is concavely defined at one side of the protrusion (231) corresponding to the front wall (16).

12. The control case according to claim 1, wherein the cable connecting zone (11) is a recessed zone (17) concavely defined at one side on a top end of the case body (1), the recessed zone (17) comprises a plurality of inserting ports (171) and a plurality of cable mounting slots (172), the cable protection cover (2) comprises a top wall (23), two second lateral walls (24) disposed at a left side and a right side of the top wall (23) and a rear wall (25) disposed at a rear side of the top wall (23), and the plurality of cable mounting slots (172) are defined between the plurality of inserting ports (171) and the rear wall (25).

13. The control case according to claim 12, wherein the rear wall (25) comprises a cable exposing port (251), and each of the connectors (12) is disposed in each of the inserting ports (171).

14. The control case according to claim 12, wherein a continuous U-shaped convex sheet (173) is disposed protrusively in the recessed zone (17), and the plurality of cable mounting slots (172) are defined in a plurality of U-shaped openings of the continuous U-shaped convex sheet (173).

* * * * *